Dec. 5, 1967     W. N. EASOM, JR     3,355,961

AUTOMOBILE TRANSMISSION SHIFT

Filed June 28, 1965     2 Sheets-Sheet 1

INVENTOR
W. N. Easom, Jr.
BY Howard E. Moore
ATTORNEY

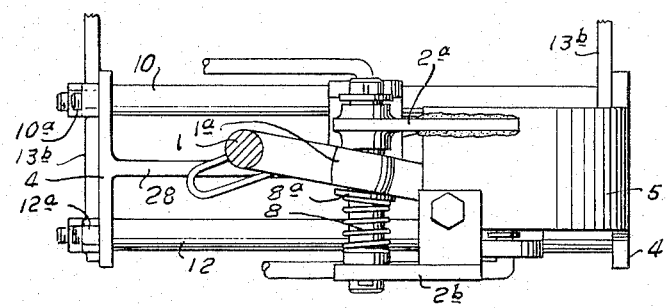

3,355,961
AUTOMOBILE TRANSMISSION SHIFT
William N. Easom, Jr., 3234 San Marcus,
Dallas, Tex. 75228
Filed June 28, 1965, Ser. No. 467,629
1 Claim. (Cl. 74—473)

ABSTRACT OF THE DISCLOSURE

An automobile transmission stick shift wherein the stick is rotatably mounted on a frame, which frame has spaced longitudinal guide rods thereon on which are slidably disposed shifting forks having recesses on the inner sides thereof. A central partition extends parallel to the guide rods which has a diagonally disposed passage at mid-point of the length thereof. A depending portion of the stick shift is arranged to pass through the diagonal passage. An elongated spring extends longitudinally of the frame and is curved to provide a guide surface on each side of the central partition in order to guide the depending portion of the shift stick toward the passage when moved longitudinally of the frame. The shift stick is mounted on a pin extending transversely of the frame and the shift stick has an enlarged passage therethrough to permit same to be tilted sidewardly and rotated about the pin. A spring is provided about the pin between the outer support thereof and the shift stick to urge the shift stick to upright neutral position when no force is exerted thereagainst. The depending portion of the shift stick is movable through the passage and engageable with the recesses in the shifting forks to permit movement of the shifting forks longitudinally of the frame. The shifting forks are attached to rods operatively connected to the transmission.

---

It is, therefore, a primary object of the invention to provide a manually operated transmission shifting device which is spring loaded to guide same from first to second and reverse positions with a minimum of effort, and without the danger of moving the control to the wrong position which could cause damage to the transmission.

Still another object of the invention is to provide such a transmission shifting mechanism as an attachment for presently existing automobiles and which may be quickly, easily and economically attached with a minimum of alterations.

Still another object of the invention is to provide such a transmission shifting attachment, which is economical to manufacture, easy to install and use, yet is smooth and easy in its operation.

Other and further objects of the invention will become apparent upon reading the detailed specification hereinafter following and by referring to the drawings annexed hereto.

A suitable embodiment of the invention is shown in the attached drawings wherein, FIGURE 1 is a side elevational view of the transmission shift attached to the transmission of an automobile in position so that the shift stick thereof is accessible from the passenger's compartment;

FIGURE 5 is a top plan view of the shifting mechanism;

FIGURE 6 is a top plan view, partially cut away, showing the left hand selector fork in second position;

FIGURE 7 is a top plan view showing the selector forks in neutral position;

FIGURE 8 is a top plan view showing the right hand selector fork in low position;

FIGURE 9 is a top plan view showing the left hand selector fork in high position; and FIGURE 10 is a top plan view showing the right hand selector fork in reverse position.

Figure 1:
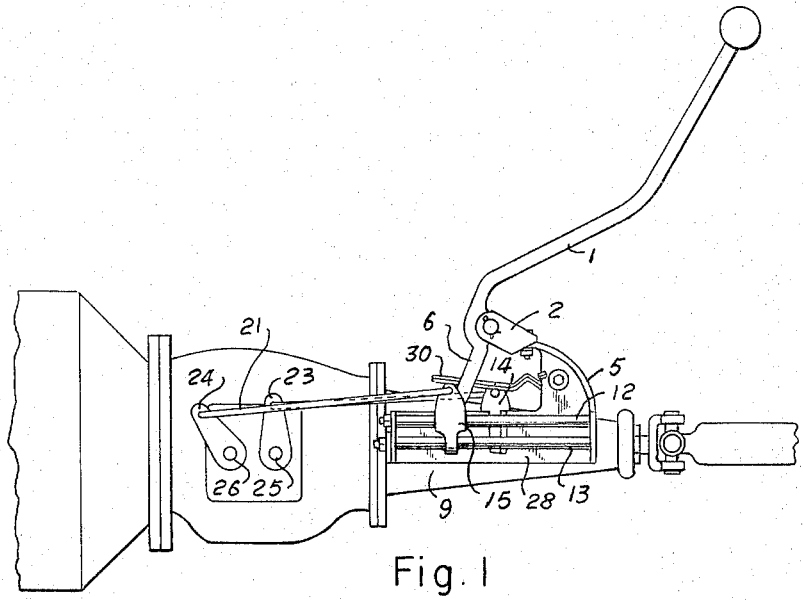
Figure 3:
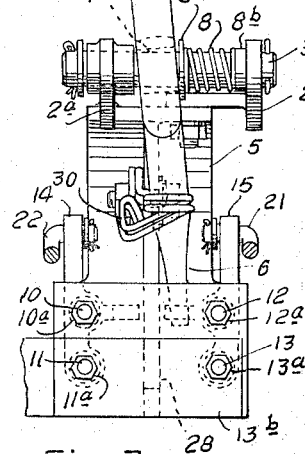
FIGURE 3 is an end elevational view taken from the left end of FIGURE 2.
Figure 2:
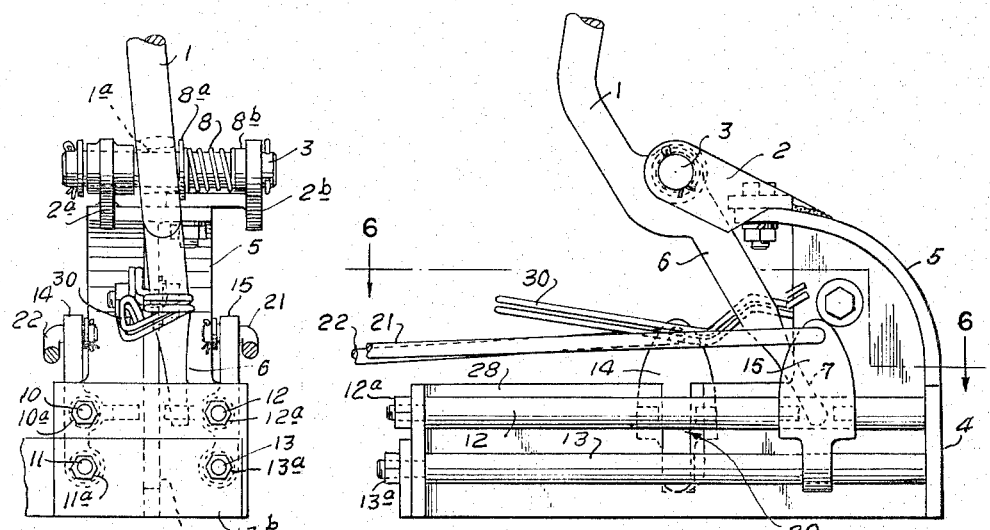
FIGURE 2 is an enlarged side elevational view showing the shift in second position.

Referring to the drawings, the shift stick 1 is pivotally mounted on a pivot pin 3, which is secured between the spaced sides supports 2a and 2b of the mounting bracket 2. The mounting bracket 2 is secured to the upper end of the arcuately shaped mounting plate 5, which extends upwardly from the frame 4.

The general frame 4 is mounted on the upper surface of the differential housing 9 and is secured thereto by suitable mounting bolts 10a–13a and brackets 13b.

The passage 1a through the shift stick 1, through which the pivot pin 3 passes, is greater in diameter than the pivot pin so that the shift stick 1 may be pivoted laterally with reference to said pin 3 for the purposes hereinafter mentioned.

A spring 8 extends about the pin 3. The outer end of the spring 8 is abutted against a collar 8b, and the inner end thereof is abutted against the thrust washer 8a, which is slidably mounted on the pin 3, so that the spring 8 urges the shift stick 1 to vertical or neutral position.

The shift stick 1 includes the vertical extension 6, which is terminated at its lower end by a substantially square portion 7 of reduced cross-sectional area.

Spaced longitudinal guide rods 10, 11, 12, and 13 are attached between the ends of the frame 4.

A right hand shifting fork 14 is slidably mounted on the guide rods 10, 11, and a left hand shifting fork 15 is slidably mounted on the guide rods 12 and 13.

Figure 4:
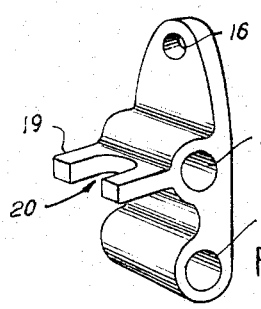
FIGURE 4 is an inside perspective view of a typical gear selector fork.

The shifting forks 14 and 15 are exactly the same in construction, and a typical shifting fork is shown in FIGURE 4.

Each said shifting fork has a rod attachment hole 16 therethrough at the upper end thereof.

A pair of spaced circular passages 17 and 18 are provided through each shifting fork, which are arranged to slidably receive the rods 10–11 or 12–13, as the case may be.

An outward extension or fork 19 is provided on the inner side of each shifting fork 14 and 15, said fork extension having a substantially semi-circular shaped recess 20 therein. A left hand link rod 21 is pivotally attached at its inner end through the hole 16 in the left hand shifting fork 15 and the forward end of the rod 21 is pivotally attached to the outer end of a shifting arm 24, which in turn is secured to a laterally extending shaft 26 through the rotation of which the transmission in the transmission housing 27 is controlled.

A right hand link rod 22 is pivotally attached at its inner end through the hole 16 provided in the right hand shifting fork 14, and the forward end of the link rod 22 is pivotally attached to the outer end of a shifting arm 23, which is secured to a lateral shaft 25 through the rotation of which the transmission in transmission housing 27 may be controlled.

A longitudinal partition 28 is provided between the ends of the housing 4. The partition 28 has a diagonally disposed passage 29 therethrough through which the lower end 7 of the shift stick 1 may pass in engaging the shifting forks 14 and 15 in the manner hereinafter described.

The diagonally disposed sides of the passage 29, provide guide surfaces for guiding the lower end 7 of the shift stick 1 through said partition.

A spring 30 has its inner end secured to the bracket 31, which extends inwardly from the end of the housing 4, said spring being secured thereto by means of a suitable bolt and nut 32.

The spring 30 is so shaped that the portion thereof in the area to the right of partition 28 angles inwardly toward the partition and the outer end 30a thereof extends into the area to the left of the partition 28, as shown in FIGURE 6 for the purpose hereinafter mentioned.

The operation and function of the transmission shifting device hereinbefore described is as follows:

If it is desired to shift the transmission to low, as shown in FIGURE 8, the lower end of shift stick 1 is tilted to the left so that the lower portion 7 thereof moves out of the passage 29 and enters the recess 20 in the shifting fork 14. The upper end of the shifting stick 1 is then drawn rearwardly to move the shifting fork 14 forwardly and thereby move the link rod 21 forwardly to rotate the lateral shaft 26 to shift the transmission into low position.

It will be observed that when the lower end 6 of the stick shift 1 is moved to low position, the outer end 30a of the spring 30 is moved outwardly, thus biasing the shift stick toward the passage 29.

When it is desired to shift the transmission to second position, the upper end of the shift stick 1 is moved forwardly, which moves the lower end 7 thereof rearwardly. The spring 30 biases the lower end 7 of the shift stick toward the passage 29 and causes it to pass therethrough into the recess 20 in the left hand shifting fork 15. Further forward movement of the upper end of the shift stick 1 will move the left hand fork 15 and link rod 22 rearwardly to rotate shaft 25 to shift the transmission to second position, as shown in FIGURE 6.

In order to shift the transmission to high position, the upper end of the shift stick 1 is moved rearwardly to move the lower end 7 thereof forwardly and thereby move the shifting fork 15 forwardly to the position shown in FIGURE 9, which is in high position.

To shift the transmission to reverse position, the left hand shifting fork 15 is moved to neutral position by moving the upper end of the shifting stick 1 forwardly. The lower end 7 of the shifting stick is moved laterally through the passage 29 into the recess 20 in the right hand shifting fork 14. The upper end of the shift stick 1 is then moved forwardly to thereby move the shifting fork 14 rearwardly to the position shown in FIGURE 10, which is in the reverse position. It will be noted in this position that the spring 30 is pressed outwardly so as to guide the lower end 7 of the shifting stick toward the passage 29 when it is moved back to neutral position for shifting to another position.

It will thus be seen that the spring 30 guides the shifting stick from first to second and reverse, making the shifting easy and sure.

Preferably the shafts 25 and 26 are spring loaded to maintain the levers 23 and 24 in upright or neutral position when no force is applied thereto. Thus, the shift stick will normally be maintained in neutral position when no force is applied thereto.

It will thus be seen that I have provided a transmission shifting apparatus, which is attachable to presently existing automobiles, which is relatively inexpensive to manufacture and install, which is easy and positive in its operation.

It will be understood that other and further embodiments of my invention may be devised without departing from the spirit and scope of the appended claim.

Having described my invention I claim:

In a transmission shifting device arranged to be attached to an automobile having a transmission housing and a pair of transmission control arms exteriorly of the housing operatively connected to the transmission in the housing; a frame including end members; guide rods on opposite sides of the frame connecting the end members; a central longitudinal wall between the end members; a diagonally disposed passage through the wall substantially mid-way of the length thereof; a shifting member slidably disposed on each rod; each said shifting member including a recess on the inner side thereof facing the passage; a link rod connecting each shifting member with one of the control arms; a transverse pin secured between opposite sides of the frame; a laterally tiltable shifting stick having an enlarged passage therethrough pivotally mounted about the pin, said shifting stick having a depending portion arranged to pass through the passage to engage the recesses in the shifting members; an elongated spring member attached at one end of the frame and extending longitudinally thereof and being shaped to slidably engage the depending end of the shifting stick to resiliently urge same toward the wall to thereby guide same into the passage; and a spring disposed about the transverse pin arranged to urge the shifting member to vertical position.

References Cited
UNITED STATES PATENTS

| | | | |
|---|---|---|---|
| 1,712,938 | 5/1929 | Short et al. | 74—473 |
| 2,198,662 | 4/1940 | Fishburn | 74—473 |
| 2,853,895 | 9/1958 | Bixby | 74—473 |
| 3,040,601 | 6/1962 | Lewis | 74—473 |
| 3,057,222 | 10/1962 | Almquist | 74—473 |
| 3,250,143 | 5/1966 | Lyon | 74—473 |

MILTON KAUFMAN, *Primary Examiner.*